United States Patent [19]

Montierth

[11] 3,715,196

[45] Feb. 6, 1973

[54] LOW-EXPANSION GLASS-CERAMIC CEMENTING METHOD

[75] Inventor: Max R. Montierth, Big Flats, N.Y.

[73] Assignee: Corning Glass Works, Corning, N.Y.

[22] Filed: Sept. 2, 1970

[21] Appl. No.: 69,133

[52] U.S. Cl. ..............................65/33, 65/43, 65/59
[51] Int. Cl. .....................C03b 29/00, C03b 27/00
[58] Field of Search..............................65/33, 59, 43

[56] References Cited

UNITED STATES PATENTS

| | | | |
|---|---|---|---|
| 3,184,370 | 5/1965 | Luks | 65/43 X |
| 3,540,957 | 11/1970 | Bawa | 65/43 X |
| 3,325,266 | 6/1967 | Stong | 65/43 X |
| 3,291,586 | 12/1966 | Chapman et al. | 65/43 X |
| 3,269,818 | 8/1966 | Tiede | 65/43 |
| 3,597,180 | 8/1971 | Erickson | 65/43 X |
| 3,392,230 | 7/1968 | Willem | 65/43 X |
| 3,239,322 | 3/1966 | Carter | 65/30 |

*Primary Examiner*—Frank W. Miga
*Attorney*—Clarence R. Patty, Jr. and Clinton S. Janes, Jr.

[57] ABSTRACT

A cementing composition and method suitable for bonding together glass-ceramic structures comprising preparing a mixture containing a thermally devitrifiable glass and a flux containing a quantity of silica fibers, applying said mixture to the glass-ceramic components to be bonded, and thereafter heat treating the cemented structure so that the cement is cured to a glass-ceramic bond which closely matches the glass-ceramic components in microstructure and thermal properties.

5 Claims, No Drawings

LOW-EXPANSION GLASS-CERAMIC CEMENTING METHOD

BACKGROUND OF THE INVENTION

In the manufacture of complex glass-ceramic structures, the cementing together of component parts to form the final article is often desirable whenever the complexity of the structure does not admit of fabrication by conventional forming methods. As is well known in the art, glass-ceramic articles are manufactured by melting a batch for a glass of appropriate composition, forming articles of the desired shape from the molten glass using conventional glass-forming techniques such as blowing, molding, and pressing, and thereafter heat-treating the articles so formed to cause controlled devitrification thereof through the formation of a crystalline phase in situ throughout the glass. It will be appreciated that the configuration of single component glass-ceramic articles is limited by the state of the glass-forming art, and that the fabrication of complex glass-ceramic structures might require the cementing or bonding together of component glass-ceramic shapes to form the desired complex article.

It has been difficult to formulate a cement which will bond well enough to glass-ceramics to be useful in the fabrication of multi-component glass-ceramic structures. Most glass bonding materials are not matched closely enough in thermal expansivity to low expansion glass-ceramic materials to retain good bonding strength upon cooling after curing or when subjected to temperature cycling. For example, U.S. Pat. No. 3,325,266 teaches one method of bonding components together to produce composite glass-ceramic articles comprising the application to at least one component of the desired structure of a cementing composition consisting essentially of at least one fluoride salt selected from the group consisting of LiF, NaF, KF, $MgF_2$, $CaF_2$, $SrF_2$, $BaF_2$, and $ZnF_2$, placing the thus-coated component in contacting relationship with another component, and thereafter heating the bodies to a temperature of at least 800°C. The difficulty with such a method is that glass-ceramics cemented thereby retain, essentially, a fluoride flux bond after firing, which continues to react with the glass-ceramic whenever the temperature of the body reaches or exceeds the original firing temperature. In addition, the bond area consists of a glassy, non-crystalline material significantly different from the cemented body in physical and chemical properties.

The problem of strong bonding is particularly complicated in certain high temperature glass-ceramic applications such as, for example, glass-ceramic heat exchangers. These applications require the fabrication of complex structures from glass-ceramic components so that they will withstand both high temperatures and rapid temperature cycling. This, in turn, requires a cement which is dimensionally stable at high temperatures as well as being closely matched in terms of physical and thermal properties to the bonded glass-ceramic components, so that losses in bond strength due to thermal expansion mismatch may be avoided.

It is, accordingly, one object of the present invention to provide a glass-ceramic cement which retains its bonding strength and dimensional stability at high temperatures.

It is a further object of this invention to provide a cementing composition and a method which may be employed in bonding together glass-ceramic components such that, upon curing, the cement exhibits thermal properties and a microstructure which are closely matched to those same properties of the bonded components.

Other objects and advantages of the present invention will become apparent from the following detailed description thereof.

BRIEF SUMMARY OF THE INVENTION

Briefly, my invention comprises a glass-ceramic cementing composition consisting essentially of a powder of a thermally devitrifiable glass having a composition principally in the $Li_2O$, ZnO, or $MgO \cdot Al_2O_3 \cdot SiO_2$ composition field, and a flux containing a quantity of silica fibers. It also comprises a method of combining, applying, and curing these constituents such that, during curing, the composition acts initially as a highly fluxing material which promotes wetting and bonding of the components to be bonded, and, subsequently, acts as a glass-ceramic bond which is closely matched to the rest of the bonded assembly in terms of microstructure, dimensional stability, and thermal properties.

DESCRIPTION OF THE PREFERRED EMBODIMENT

The preferred cementing composition according to the present invention forms a low-expansion glass-ceramic cement in the $Li_2O \cdot Al_2O_3 \cdot SiO_2$ composition field upon curing. This material is preferred for glass-ceramic heat exchanger applications because it closely matches the preferred $Li_2O \cdot Al_2O_3 \cdot SiO_2$ glass ceramic components of these structures in terms of composition, thermal expansivity, and microstructure. Specifically, the cured glass-ceramic cement material consists essentially, in weight percent as calculated from the batch, of about 60–80 percent $SiO_2$, 18–25 percent $Al_2O_3$, 2–10 percent $Li_2O$, 0–3.3 percent $B_2O_3$, and 0.8–4.6 percent LiF, and is characterized by a principal crystal phase consisting essentially of beta-spodumene ($Li_2O \cdot Al_2O_3 \cdot 4SiO_2$) solid solution which comprises 85–90 percent by volume of the cured cement. Since the glass-ceramic components with which the cement is to be used also generally have beta-spodumene as the principal crystal phase, the physical and chemical characteristics of the bond match those of the components, and a high-strength, dimensionally stable, low-expansion composite article results.

The selection of compounds and materials for the cement batch and the method of combining them so as to yield a cured cement of the aforesaid composition and structure is of critical importance in achieving the objects of the invention. What is desired is a cementing material which will be highly fluxing at the commencement of the curing cycle to insure good bonding to the glass-ceramic components, but which will subsequently undergo controlled devitrification by the formation of a beta-spodumene crystalline phase in situ in the cement as curing continues, so that a bond exhibiting the desirable properties of glass-ceramic material will be formed.

I have discovered that these objects can be achieved by formulating a batch for a glass-ceramic cement consisting essentially, in weight percent, of about 60–90 percent of a powder of a thermally devitrifiable glass and about 10–40 percent of a fiber-flux mixture. The preferred glass composition for the glass powder constituent of the batch consists essentially, in weight percent on the oxide basis as calculated from the batch, of about 60–80 percent $SiO_2$, 10–25 percent $Al_2O_3$, 2–10 percent $Li_2O$, 0–5 percent BaO, and not more than about 5 percent of other oxides, fining agents, and impurities as required by the specific glass composition. The fiber-flux constituent of the batch consists essentially, in weight percent, of about 5–25 percent $AlBO_3$, 3–25 percent LiF, and 60–80 percent fused silica fibers. A suitable alternate flux consists essentially, in weight percent, of about 5–25 percent $Al(OH)_3$, 0–15 percent $H_3BO_3$, 3–25 percent LiF, and 60–80 percent fused silica fibers, and, if used, should also be present in amounts ranging about 10–40 percent by weight of the cement batch.

Both the chemical composition and physical form of the glass powder are important for the purposes of the present invention. The glass powder specified for the preferred composition is within an area of composition in which a beta-spodumene crystalline phase will readily form in situ in the glass upon proper heat treatment. This beta-spodumene crystalline phase is important in attaining a low-expansion cement which is dimensionally stable at high temperatures. The aforesaid area of glass composition is also desirable in that the formation of the beta-spodumene crystalline phase commences at a comparatively low temperature of around 900°C. thereby implementing low-temperature curing.

The physical size of the glass particles is important insofar as it affects the homogeneity of the mixture and thus of the resultant beta-spodumene crystalline phase. I have found that a powder wherein substantially all of the particles are less than about 30 microns and preferably between about 1–20 microns in diameter is preferred.

The presence of a fluxing material in the cement is important, as it provides the wetting characteristics necessary for good bonding. Although the preferred glass powder alone sinters as a glass at about 850°C., it does not provide sufficient wetting power to cement glass-ceramic materials. It is also important that the flux be composed of low temperature reacting constituents which will interact with the silica fibers present in the cement during curing to bring the overall composition thereof into the range where a beta-spodumene phase is readily formed. In this way continuous beta-spodumene crystallinity in the cured cement is insured and the presence of high expansion glassy phases is minimized.

The silica constituent of the flux should be present initially in fiber form. These fibers improve the wet strength, consistency, and drying characteristics of the uncured cement and, more importantly, do not interfere with the wetting characteristics of the fluxing agents at the beginning of the curing cycle. However, as curing commences, these fibers will readily interact with the fluxing agents to form first a glass and subsequently a beta-spodumene crystalline phase therein so as to become an active part of the structure of the cured cement.

The quantity of silica fibers used in formulating the composition is determined primarily by considerations as to the glass composition resulting after reaction of the fluxing constituents therewith, since the resulting glass should be in a composition area where beta-spodumene crystallinity will readily occur. The size of the fibers used is important since it affects the wet strength and handling characteristics of the uncured material as well as the homogeneity of the cured glass-ceramic cement. Generally, silica fibers of a diameter less than about 100 microns are suitable, with fused silica fibers of a diameter ranging from about 10–30 microns being preferred. The fibers should be of a length sufficient to prevent cracking during drying and provide a measure of wet strength when liquid carriers are used with the cement to form a paste. In such cases, length-to-diameter ratios of at least about 20 to 1 are preferred.

The weight ratios of fluxing material-to-base glass powder may be varied within the specified range depending upon the degree of bond strength required for a given firing temperature. High quantities of flux will give better bonding at lower temperatures but will yield a softer cement. The degree of bonding required as well as the expansion characteristics of the cured cement, may also be controlled by varying the composition of the flux. Generally, compositions high in $AlBO_3$ or $H_3BO_3$ will give glass-ceramic cements exhibiting increased coefficients of thermal expansion, while compositions high in LiF bond better to glass-ceramics but will yield softer cements.

Heat treatment temperatures which are useful in curing the preferred cements of the present invention range from about 850° to 1,300°C. The sequence of curing for the cement consists of the sintering of the glass powder between 800°–1,000°C., the reacting of the active fluxing constituents with the silica fibers and glass powder between about 900°–1,300°C., and the subsequent crystallizing in situ of a beta-spodumene crystalline phase within the glassy phase of the cement between about 900°–1,300°C. to produce a well-bonded, continuous glass-ceramic structure. Generally, temperatures ranging between about 1,000°–1,100°C. are preferred for curing the beta-spodumene-containing cements of the invention, and curing times ranging from about 2 to about 12 hours are sufficient to cause complete curing in this temperature range. If curing temperatures in the lower range of effective temperatures, for example, near 900°C., are used, longer times up to about 24 hours may be required to obtain complete curing, whereas curing temperatures in the upper range of useful temperatures, for example near 1,300°C., require shorter curing times of not more than about 2–4 hours, depending upon the overall cement composition. Of course, longer curing times at any temperature within the effective range may be employed, but such extended treatment times are of no particular advantage.

It is possible to exert a measure of control over the thermal expansivity of the cured cement by varying the curing cycle and flux composition. Table I illustrates the effect of variations in flux composition and heat treatment on the thermal expansivity of several examples of the preferred low-expansion cement of the present invention. The cements all contained, in addition to the fluxes of the compositions shown in Table I, 90 percent by weight of a thermally devitrifiable base glass power consisting essentially in weight percent as calculated from the batch, of 72.3 percent $SiO_2$, 22.8 percent $Al_2O_3$, and 4.9 percent $Li_2O$. The flux compositions shown in Table I, which comprised the remaining 10 percent by weight of the cement batch, are given in weight percent on the oxide basis as calculated from the flux batch. Thus the LiF which was added to the flux batch is shown as equivalent lithia in the table, and since the flux compositions shown made up only 10 percent of the total cement batch, LiF was only a minor constituent of the cured cement. Nevertheless, the high LiF proportions relative to the flux batch produced initial fluxing action in far greater magnitude than the overall cement composition would indicate.

The $SiO_2$ constituent of the flux was added in the form of fused silica fibers, and the $Al_2O_3$ and $B_2O_3$ were added as $AlBO_3$ and/or $H_3BO_3$ and $Al(OH)_3$. The coefficients of thermal expansion, which were not measured in all cases, are for the cured cement, and are given as an average over the range from 0°–900°C.

The heat curing cycles employed were the following:
A — Heat to 1,000°C. at 80°C./hour, hold 10 hours
B — Heat to 1,000°C. at 360°C./hour, hold 10 hours
C — Heat to 960°C. at 360°C./hour, hold 10 hours
D — Heat to 1,040°C. at 360°C./hour, hold 10 hours

TABLE I

| | Flux Composition (10% of total Cement Batch) | | | | Cured Cement Average Thermal Expansion $(cm/cm°C. \times 10^7)$ | | | |
|---|---|---|---|---|---|---|---|---|
| | $SiO_2$ | $Al_2O_3$ | $B_2O_3$ | $Li_2O$ | Cycle A | Cycle B | Cycle C | Cycle D |
| 1 | 60.0 | 33.0 | — | 7.0 | 2.7 | 3.5 | 2.6 | — |
| 2 | 67.5 | 26.8 | — | 5.7 | 2.8 | 3.1 | 2.8 | — |
| 3 | 75.0 | 20.6 | — | 4.4 | 0.8 | 2.3 | 1.6 | 4.9 |
| 4 | 60.0 | 16.0 | 17.0 | 7.0 | 4.4 | 7.0 | 6.7 | — |
| 5 | 67.5 | 13.0 | 14.0 | 5.5 | 5.1 | 4.0 | 6.5 | 7.8 |
| 6 | 75.0 | 10.0 | 10.5 | 4.5 | 5.4 | 5.3 | 6.1 | — |
| 7 | 60.0 | 16.0 | — | 24.5 | 3.2 | 1.3 | 5.6 | — |
| 8 | 67.5 | 13.0 | — | 19.5 | 2.3 | 3.7 | 4.3 | — |
| 9 | 75.0 | 10.0 | — | 15.0 | 0.7 | -1.2 | 0.0 | — |
| 10 | 60.0 | 16.0 | 5.6 | 18.4 | 1.1 | 3.7 | 5.6 | 3.2 |
| 11 | 67.5 | 13.0 | 7.0 | 12.5 | 0.8 | 3.6 | 3.3 | 2.0 |
| 12 | 60.0 | 16.0 | 11.4 | 12.6 | 2.4 | 3.4 | 4.1 | 3.4 |
| 13 | 60.0 | 21.6 | 11.4 | 7.0 | 4.2 | 3.5 | 5.8 | — |
| 14 | 67.5 | 20.0 | 7.0 | 5.5 | 4.4 | 4.3 | 5.6 | — |
| 15 | 60.0 | 27.4 | 5.6 | 7.0 | 3.4 | 4.7 | 4.9 | 5.2 |
| 16 | 60.0 | 21.7 | — | 18.3 | 1.0 | 1.6 | 1.9 | 1.9 |
| 17 | 67.5 | 20.0 | — | 12.5 | 4.0 | 4.6 | 3.8 | 3.5 |
| 18 | 60.0 | 27.3 | — | 12.7 | 3.1 | 3.4 | 3.9 | 2.8 |
| 19 | 60.0 | 21.8 | 5.6 | 12.6 | 2.6 | 3.3 | 2.6 | 2.6 |
| 20 | 67.5 | 17.6 | 4.7 | 10.1 | 2.8 | 3.1 | 4.2 | 3.2 |

Using both composition and heat treatment variations, low-expansion cements in the preferred range of compositions can be produced exhibiting any desired coefficient of thermal expansion in the range from about −5 to +30 × $10^{-7}$/°C. This permits close expansion matching with most low-expansion beta-spodumene-containing glass-ceramic components.

The above-described method of formulating thermally-devitrifiable cements to match the characteristics of the glass-ceramics to be bonded is not limited to $Li_2O·Al_2O_3·SiO_2$ glass-ceramics alone. It may also be successfully employed to bond $ZnO·Al_2O_3·SiO_2$ and $MgO·Al_2O_3·SiO_2$ glass-ceramics, as long as the cement is formulated to yield the desired expansivity and crystalline phase upon curing. Thus, $MgO·Al_2O_3·SiO_2·TiO_2$ glass-ceramics wherein the principal crystal phase is cordierite ($2MgO·2Al_2O_3·5SiO_2$) may be cemented by formulating a batch for a cement consisting essentially, by weight, of 60–90 percent of a thermally-devitrifiable glass powder in the $MgO·Al_2O_3·SiO_2·TiO_2$ composition field which will contain cordierite as the principal crystal phase upon controlled devitrification, and 10–40 percent of a flux which consists essentially, by weight, of 40–80 percent silica fibers, 3– 25 percent $MgF_2$ and 10–35 percent $AlBO_3$. An optional flux consists essentially, by weight, of 40–80 percent silica fibers, 3–25 percent $MgF_2$, 10–35 percent $Al(OH)_3$ and 0–23 percent $H_3BO_3$.

Thermally devitrifiable glass powders which are preferred for bonding glass-ceramics in the $MgO·Al_2O_3·SiO_2·TiO_2$ composition field consist essentially, in weight percent on the oxide basis as calculated from the batch, of about 40–80 percent $SiO_2$, 10–35 percent $Al_2O_3$, 3–15 percent $TiO_2$ and 5–20 percent MgO. Minor amounts of other oxides, oxidizing agents, fining agents, and impurities may be tolerated. Considerations as to the particle size of the glass powder and the fiber size of the fused silica for these cordierite-containing cements are the same as those previously discussed for beta-spodumene cements. Likewise, similar control over the thermal expansivity of the cement may be exercised by varying the composition of the flux and the curing cycle for the cements, so that thermal expansions ranging from about 20 to 50 × $10^{-7}$/°C. may be obtained.

The curing process for the above-described $MgO·Al_2O_3·SiO_2·TiO_2$ cements proceeds in substantially the same manner as described for the beta-spodumene cements, but occurs over the somewhat higher temperature range of about 1,000°–1,300°C. Curing times ranging from about 2–12 hours at temperatures ranging from about 1,100°–1,200°C. are preferred.

Glass-ceramics in the $MgO·Al_2O_3·SiO_2·B_2O_3·K_2O·F$ composition field wherein the principal crystal phase is the fluorophlogopite, or fluormica, ($KMg_3AlSi_3O_{10}F_2$) may be cemented by formulating a batch for a cement consisting essentially of 60–90 percent of a thermally-devitrifiable glass powder in the $MgO·Al_2O_3·B_2O_3·K_2O·F·SiO_2$ composition field which will contain fluormica as the principal crystal phase upon controlled devitrification, and 10–40 percent of a flux which consists essentially, by weight, of 40–80 percent silica fibers, 3–25 percent $MgF_2$, 5–15 percent $K_2O$, and 10–50 percent $AlBO_3$, along with such other minor constituents as to match the base glass composition. An optional flux consists essentially, by weight, of 40–80 percent silica fibers, 3–25 percent $MgF_2$, 5–15 percent $K_2O$, 10–50 percent $Al(OH)_3$, and 0–30 percent $H_3BO_3$.

Thermally-devitrifiable glass powders which are preferred for bonding glass-ceramics in the fluorophlogopite composition field consist essentially, in weight percent on the oxide basis as calculated from the batch, of about 35–48 percent $SiO_2$, 5–15 percent $B_2O_3$, 14–22 percent $Al_2O_3$, 15–25 percent MgO, 3–8 percent $K_2O$, and 5–10 percent F. Minor additions of other oxides such as $P_2O_5$, $TiO_2$, $ZrO_2$, BaO, CaO, SrO, FeO, ZnO, CdO, $GeO_2$, $SnO_2$, PbO, etc. may also be made. Considerations as to the particle size of the glass powder and the fiber size of the fused silica for these fluormica-containing cements are the same as those previously discussed for beta-spodumene-containing cements. Likewise, similar control over the thermal expansivity of the cement may be exercised by varying the composition of the flux and the curing cycle for the cements; while control over the hardness may be exercised by varying the flux compositions and the flux-to-base glass ratio. Expansions ranging from 70 to 130 × $10^{-7}/°C$. may be obtained.

The curing process for the above-described $M_gO·Al_2O_3·SiO_2·TiO_2$ cements proceeds in substantially the same manner as described for the beta-spodumene cements, with curing times of 2 to 12 hours at temperatures of 800°C. to 1,000°C. being preferred.

Glass-ceramic cements may be similarly formulated in the $ZnO·Al_2O_3·SiO_2·ZrO_2$ composition system to bond $ZnO·Al_2O_3·SiO_2·ZrO_2$ glass-ceramics having either beta-quartz or zinc petalite as the principal crystal phase. Zinc petalite has been so called because the pattern thereof observed in X-ray diffraction analysis very closely approximates that of petalite ($LiAlSi_4O_{10}$). It is deemed to be a solid solution containing at least one of the following crystal phases: $ZnAl_2Si_3O_{10}$, $ZnSi_2O_5$, and $ZnAl_2Si_8O_{20}$, which are zinc analogs of petalite.

Such cements consist essentially, by weight, of 60–90 percent of a thermally-devitrifiable glass powder in the $ZnO·Al_2O_3·SiO_2·ZrO_2$ composition field which will yield the desired beta-quartz or zinc petalite crystal phase upon controlled devitrification, and 10–40 percent of a silica fiber-containing flux.

Preferred glass powders for such cements consist essentially, in weight percent on the oxide basis as calculated from the batch, of about 40–60 percent $SiO_2$, 20–30 percent $Al_2O_3$, 20–30 percent ZnO, 0–15 percent $ZrO_2$ and, optionally, 0.001–0.5 percent of metallic Au, Cu, Ag, and/or Pt. Normally, at least 3 percent $ZrO_2$ is required where it is used as the sole nucleating agent. Minor amounts of other oxides, oxidizing agent, fining agents, and impurities may be present. Suitable fluxing compositions consist essentially in weight percent, of 40–60 percent fused silica fibers, 3–25 percent $ZnF_2$, and 15–35 percent $AlBO_3$. An optional flux consists essentially, in weight percent, of 40–60 percent silica fibers, 3–25 percent $ZnF_2$, 15–35 percent $Al(OH)_3$ and 0–23 percent $H_3BO_3$.

Curing temperatures ranging from about 700°–900°C. are suitable for curing the $ZnO·Al_2O_3·SiO_2·ZrO_2$ cements of the invention, with times ranging from about 2–12 hours being sufficient to insure complete reaction and crystallization. Generally, cements containing metallic Pt, Cu, Ag or Au will form zinc petalite as the principal crystal phase upon curing, while cements containing significant amounts of $ZrO_2$ will form beta-quartz. Again a measure of control over the thermal expansivity of the cured cements may be exercised by varying the flux composition and curing cycle, so that expansivities ranging from about 0–15 × $10^{-7}/°C$. may be obtained.

The exact compositions of the glass-ceramics which may be bonded according to the methods of the present invention are not critical. If the glass-ceramic components have compositions principally in one of the $Li_2O$, MGO, or $ZnO·Al_2O_3·SiO_2$ composition fields and contain principal crystal phases of beta-spodumene, cordierite, zinc petalite, fluorophlogopite, or beta-quartz, the cement composition and curing cycle may be adjusted so that the cement will match the glass-ceramic components in crystalline structure and thermal expansivity upon curing. Table II lists some examples of glass-ceramic materials of various compositions which may be successfully bonded according to the invention. Also shown are the thermal expansivities and crystalline structures of the materials.

TABLE II

COMPOSITIONS

| | A | B | C | D |
|---|---|---|---|---|
| $SiO_2$ | 72.3 | 69.9 | 69.1 | 47.0 |
| $Al_2O_3$ | 22.8 | 17.5 | 18.3 | 23.5 |
| $Li_2O$ | 4.9 | 4.3 | 2.71 | — |
| $TiO_2$ | — | 4.34 | 4.67 | — |
| $As_2O_3$ | — | 0.8 | 0.75 | — |
| MgO | — | — | 2.65 | — |
| ZnO | — | — | 0.95 | 23.5 |
| BaO | — | 3.1 | — | — |
| $Na_2O$ | — | — | 0.37 | — |
| $K_2O$ | — | — | 0.07 | — |
| $B_2O_3$ | — | — | 0.07 | — |
| $ZrO_2$ | — | — | 0.25 | 6.0 |
| CaO | — | — | — | — |
| Principal Crystal Phase | beta-spodumene | beta/beta spodumene | spodumene | beta-quartz |
| Percent Crystallinity | 90–95 | 85–95 | 85–95 | 80–90 |
| Thermal Expansivity ($×10^{-7}/°C$.) | 5–6 | 6–7 | 12–18 | 3 |
| | E | F | G | |
| $SiO_2$ | 49.6 | 47.0 | 43.9 | |
| $Al_2O_3$ | 27.3 | 23.5 | 15.8 | |
| $TiO_2$ | 9.9 | — | — | |
| $As_2O_3$ | 0.4 | — | — | |
| MgO | 12.7 | — | 14.0 | |
| ZnO | — | 23.5 | — | |
| $K_2O$ | — | — | 10.8 | |
| $B_2O_3$ | — | — | 8.1 | |
| $ZrO_2$ | — | 6.0 | — | |
| CaO | 0.1 | — | — | |
| F | — | — | 7.3 | |
| Pt/Au | — | trace | — | |
| Principal Crystal Phase | cordierite | zinc petalite | fluorophlogopite | |
| Percent Crystallinity | 85–95 | 80–95 | 50–90 | |
| Thermal Expansivity ($×10^{-7}/°C$.) | 20–30 | 0–15 | 70–100 | |

For certain applications it may be desirable that the cement composition be in the form of a paste or liquid. In such cases, liquid carriers may be used to obtain the desired liquidity in the uncured composition. Water, alcohols, and other organic solvents are examples of suitable liquids; however, any liquid may be used which will volatilize during curing so as to leave the composition of the cured cement essentially unaffected.

The invention may be further illustrated by way of the following specific cement compositions and procedure:

EXAMPLE I

A mixture was first prepared containing 72 percent by weight of a glass powder and 28 percent by weight of a flux containing fine fused silica fibers. The glass powder used was of composition A of Table II, consisting essentially, as calculated in weight percent on the oxide basis, of 72.3 percent $SiO_2$, 22.8 percent $Al_2O_3$, and 4.9 percent $Li_2O$ and was of a particle size such that substantially all of the particles were between 1–20 microns in diameter. The flux consisted essentially, by weight, of 20 percent $AlBO_3$, 8.5 percent LiF, and 71.5 percent fused silica fibers. The fibers were about 10 microns in diameter with a length-to-diameter ratio of about 20 to 1. The aforementioned constituents were mixed with water by means of a spatula to a consistency which expedited coating both the horizontal and vertical mating surfaces of two glass-ceramic components therewith. The glass-ceramic components were of composition A of Table II. A composite article was then formed by applying the cement in the form of a paste to the components by means of a spatula, placing them in contacting relationship with one another, and thereafter heating the composite to a temperature of 1,040°C. maintaining it thereat for about 10 hours, and finally cooling to room temperature. The resulting cured cement was determined through electron microscopy to be about 85 percent crystalline by volume with the crystalline phase identified by X-ray diffraction as consisting essentially of beta-spodumene solid solution. The average coefficient of thermal expansion of the cured cement between 0°–1,000°C. was about $10 \times 10^{-7}$/°C. as compared with about $6 \times 10^{-7}$/°C. for the bonded glass-ceramic components.

EXAMPLE II

A mixture was prepared containing 80 percent by weight of a thermally devitrifiable glass powder and 20 percent by weight of a flux. The glass powder employed was of composition E of Table II, having a particle size substantially the same as the glass powder of Example I above. The flux employed consisted essentially of 60 percent by weight fused silica fibers, 20 percent $Al(OH)_3$ and 12 percent $MgF_2$ by weight. The silica fibers were of a size substantially the same as that of Example I. The aforementioned constituents were mixed with water and applied to the glass-ceramic components to be bonded. These components had the composition and crystalline structure of composition E of Table II. The composite article was then formed, heat treated at a temperature of 1,100°C. for 10 hours, and cooled to room temperature. The resulting cured cement was about 80 percent crystalline by volume with a crystalline phase identified by X-ray diffraction as consisting essentially of cordierite. The average coefficient of thermal expansion of the cured cement between 0°–900C. was $40 \times 10^{-7}$/°C. as compared with about $30 \times 10^{-7}$/°C. for the bonded glass-ceramic components.

EXAMPLE III

A mixture was prepared containing 80 percent by weight of a thermally devitrifiable glass powder and 20 percent by weight of a flux containing fused silica fibers. The glass powder was of a particle size substantially the same as that of the powder of Example I, and of Composition D of Table II. The fused silica fibers in the flux were of a size substantially the same as that of the fibers of Example I. The flux consisted essentially, in weight percent, of 60 percent silica fibers, 28 percent $Al(OH)_3$ and 12 percent $ZnF_2$. The aforementioned constituents were mixed with water and applied to glass-ceramic components having a composition and crystalline structure the same as Composition D of Table II. A composite article was then formed and heat treated at a temperature of 800°C. for 10 hours. The resulting cured cement was about 75 percent crystalline by volume, with the crystal phase being identified by X-ray diffraction as consisting essentially of beta-quartz. The average coefficient of thermal expansion of the cured cement between 0°–800° C. was $5 \times 10^{-7}$/°C. as compared with about $3 \times 10^{-7}$/°C. for the bonded glass-ceramic components.

EXAMPLE IV

A mixture was prepared containing 80 percent by weight of a thermally devitrifiable glass powder having the composition of Composition G of Table II and 20 percent by weight of a flux. The glass powder was of a particle size substantially the same as that of the powder of Example I. The flux consisted essentially, in weight percent, of 60 percent fused silica fibers, 20 percent $AlBO_3$, 12 percent $MgF_2$, and 8 percent $K_2O$. The fused silica fibers were of a size substantially the same as that of the fibers of Example I. The aforementioned constituents were mixed with water and applied to glass-ceramic components having a composition and crystalline structure essentially the same as Composition G of Table II. A composite article was then formed, heat treated at a temperature of 900°C. for 10 hours, and cooled to room temperature. The resulting cured cement was about 60 percent crystalline by volume, with the crystal phase being identified by X-ray diffraction as consisting essentially of fluorophlogopite. The average coefficient of thermal expansion of the cured cement between 0°–900°C. was $90 \times 10^{-7}$/°C. as compared with $80 \times 10^{-7}$/°C. for the bonded glass-ceramic components.

I claim:

1. A method of bonding glass-ceramic components together to form a bonded glass-ceramic assembly having a principal crystal phase consisting essentially of a species selected from the group consisting of beta-spodumene, cordierite, zinc petalite, beta-quartz, and fluorophlogopite, wherein the principal crystal phase of the bond area matches the principal crystal phase of the glass-ceramic assembly comprising the steps of:

a. preparing a fluxing cementing composition consisting essentially, in weight percent, of 60–90 percent of a thermally devitrifiable glass and 10–40 percent of a fiber-flux mixture;

i. said thermally devitrifiable glass being selected from the group of glasses which upon controlled devitrification will have a principal crystal phase consisting essentially of a species selected from the group consisting of beta-spodumene, cordierite, zinc petalite, beta-quartz and fluorophlogopite, said principal crystal phase matching the principal crystal phase of the glass-ceramic assembly; and ii. said fiber-flux mixture consisting essentially of a fused silica fiber constituent, a metal fluoride salt constituent selected from the group consisting of LiF, $ZnF_2$ and $MgF_2$, and at least one other constituent selected from the group consisting of $AlBo_3$, $Al(OH)_3$, and $H_3BO_3$, the composition of said fiber-flux mixture being such that, upon heating, the constituents of said fiber-flux mixture will interact to form a glass which upon controlled devitrification will have a principal crystal phase consisting essentially of a species selected from the group consisting of beta-spodumene, cordierite, zinc petalite, beta-quartz, and fluorophlogopite, said principal crystal phase matching the principal crystal phase of the glass-ceramic assembly, b. applying said fluxing cementing compositing to selected areas of at least one of said glass-ceramic components;

c. placing said glass-ceramic components in contacting relationship with one another to form said glass-ceramic assembly; and d. subjecting said glass-ceramic assembly to heat treatment at a temperature at least sufficient to cause controlled devitrification of said thermally devitrifiable glass, interaction of said constituents of said fiber-flux mixture to form a glass, and controlled devitrification of said glass, but below a temperature at which said glass-ceramic assembly will deform, for a time at least sufficient to obtain substantially complete crystallization of said fluxing cementing composition, so as to convert said fluxing cementing composition from a glassy state to a glass-ceramic bond having a principal crystal phase consisting essentially of a species selected from the group consisting of beta-spodumene, cordierite, zinc petalite, beta-quartz and fluorophlogopite which matches the principal crystal phase of said glass-ceramic assembly.

2. The method of claim 1 wherein said thermally devitrifiable glass is selected from the following four groups of glasses wherein the compositions thereof consist essentially, in weight percent on the oxide basis as calculated from the batch, of about:

(Group A) 60–80% $SiO_2$, 10–25% $Al_2O_3$, 2–10% $Li_2O$, and 0–5% BaO;
(Group B) 40–80% $SiO_2$, 10–35% $Al_2O_3$, 5–20% MgO, and 0–15% $TiO_2$;
(Group C) 40–60% $SiO_2$, 20–30% $Al_2O_3$, 20–30% ZnO, 0–15% ZrO, and 0–0.5% Ag, Au, Cu, and/or Pt;
(Group D) 35–48% $SiO_2$, 5–15% $B_2O_3$, 14–22% $Al_2O_3$, 15–25% MgO, 3–8% $K_2O$, and 5–10% F.

said thermally devitrifiable glass being selected as follows:

from Group A when said glass-ceramic components to be bonded have a principal crystal phase consisting essentially of beta-spodumene;
from Group B when said glass-ceramic components to be bonded have a principal crystal phase consisting essentially of cordierite;
from Group C when said glass-ceramic components to be bonded have a principal crystal phase consisting essentially of beta-quartz or zinc petalite; and
from Group D when said glass-ceramic components to be bonded have a principal crystal phase consisting essentially of fluorophlogopite; and wherein said fiber-flux mixture is selected as follows:

from the two following compositions when utilized with the thermally devitrifiable glasses of Group A, said compositions being expressed in weight percent:

1. 60–80% silica fibers, 3–25% LiF, and 5–25% $AlBO_3$; and
2. 60–80% silica fibers, 3–25% LiF, 5–25% $Al(OH)_3$ and 0–15% $H_3BO_3$;

from the two following compositions when utilized with the thermally devitrifiable glasses of Group B, said compositions being expressed in weight percent:

3. 40–80% silica fibers, 3–25% $MgF_2$, and 10–35% $AlBO_3$; and
4. 40–80% silica fibers, 3–25% $MgF_2$, 10–35% $Al(OH)_3$, and 0–23% $H_3BO_3$;

from the two following compositions when utilized with the thermally devitrifiable glasses of Group C, said compositions being expressed in weight percent:

5. 40–60% silica fibers, 3–25% $ZnF_2$, and 15–35% $AlBO_3$; and
6. 40–60% silica fibers, 3–25% $ZnF_2$, 15–35% $Al(OH)_3$, and 0–23% $H_3BO_3$; and from the two following compositions when utilized with the thermally devitrifiable glasses of Group D, said compositions being expressed in weight percent:

7. 40–80% silica fibers, 3–25% $MgF_2$, 5–15% $K_2O$, and 10–50% $AlBO_3$; and
8. 40–80% silica fibers, 3–25% $MgF_2$, 5–15% $K_2O$, 10–50% $Al(OH)_3$ and 0–30% $H_3BO_3$.

3. The method of claim 2 wherein said heat treatment comprises:

a. heating at a temperature ranging from about 1,000°C. to about 1,100°C. for a time ranging from about 2–12 hours when said principal crystal phase of said glass-ceramic assembly consists essentially of beta-spodumene;

b. heating at a temperature ranging from about 1,100°C. to about 1,200°C. for a time ranging from about 2–12 hours when said principal crystal phase of said glass-ceramic assembly consists essentially of cordierite;

c. heating at a temperature ranging from about 700°C. to about 900°C. for a time ranging from about 2–12 hours when said principal crystal phase of said glass-ceramic assembly consists essentially of beta-quartz or zinc petalite; and d. heating at a temperature ranging from about 800°C. to about 1,000°C. for a time ranging from about 2–12 hours when said principal crystal phase of said glass-ceramic assembly consists essentially of fluorophlogopite.

4. The method of claim 2 wherein said thermally devitrifiable glass is in the form of a powder having a particle size ranging from about 1 to about 30 microns.

5. The method of claim 2 wherein the fiber constituent of said fiber-flux mixture consists of fused silica fibers having a diameter of less than about 100 microns and a length-to-diameter ratio of about 20 to 1.

* * * * *